US006931846B1

(12) United States Patent
Trinkel, Jr.

(10) Patent No.: US 6,931,846 B1
(45) Date of Patent: Aug. 23, 2005

(54) EQUALIZING FLOW FROM PRESSURE COMPENSATED PUMPS, WITH OR WITHOUT LOAD SENSING, IN A MULTIPLE PUMP CIRCUIT

(76) Inventor: Edgar W. Trinkel, Jr., 726 Outer Gray St., Newburgh, IN (US) 47630

(*) Notice: Subject to any disclaimer, the term of this patent is extended or adjusted under 35 U.S.C. 154(b) by 140 days.

(21) Appl. No.: 10/636,833

(22) Filed: Aug. 6, 2003

Related U.S. Application Data

(60) Provisional application No. 60/405,674, filed on Aug. 24, 2002.

(51) Int. Cl.[7] .............................................. F16D 31/02
(52) U.S. Cl. ............................ 60/419; 60/428; 60/405
(58) Field of Search .......................... 60/405, 419, 428, 60/486

(56) References Cited

U.S. PATENT DOCUMENTS 6,276,468 B1 * 8/2001 Essig et al. ................... 60/486
6,438,951 B2 * 8/2002 Morgan ........................ 60/419
6,823,671 B2 * 11/2004 Achten ........................ 60/419

* cited by examiner

*Primary Examiner*—Edward K. Look
*Assistant Examiner*—Michael Leslie
(74) *Attorney, Agent, or Firm*—George H. Morgan P.E.; Mark A. Manley P.E.

(57) ABSTRACT

A rotary flow combiner allows flow from multiple pressure compensated hydraulic pumps; with or without load sensing to be combined into a single outlet. The flows are combined in such a way that each input to the rotary flow combiner has equal flow. The flow from each pump is optimized in such a way that the output from the rotary flow combiner can achieve the maximum range of flow and pressure and so that all the pumps in the multiple pump system are supplying fluid flow at all times. A check valve can allow the rotary flow combiner to pull hydraulic fluid direct from a reservoir in parallel to a lower flow pump such that the volume of flow from the lower pump combined with the fluid drawn directly from the reservoir will match the flow from the higher flow pump.

17 Claims, 6 Drawing Sheets

EQUALIZING FLOW FROM PRESSURE COMPENSATED PUMPS, WITH OR WITHOUT LOAD SENSING, IN A MULTIPLE PUMP CIRCUIT

CROSS REFERENCE TO RELATED APPLICATIONS

Provisional application for patent No. 60/405,674 of Aug. 24, 2002 with the same title: "Equalizing Flow From Pressure Compensated Pumps, With or Without Load Sensing, in a Multiple Pump Circuit" which is hereby incorporated by reference. Applicant claims priority pursuant to 35 U.S.C. Par. 119 (e) (I).

Statement as to rights to the invention made under federally sponsored research and development: not applicable.

BACKGROUND OF THE INVENTION

1. Field of the Invention

This invention relates to improving the performance of two or more pressure compensated pumps, with or without load sensing, that supply fluid to a single driven circuit. The invention uses a rotary type flow divider operating in reverse to make fluid flow through the pumps at the same rate of flow even when the pumps are limited to different output pressures.

2. Background Information

It is often necessary to use more than one pressure compensated pump, with or without load sensing, to supply a hydraulic circuit's highest flow demand. A prior art hydraulic system might use separate pumps, with separate drive motors for each pump, to feed into a common manifold that supplies pressurized hydraulic fluid to a circuit. In such a prior art arrangement there is an attempt to set each pump so that they will operate at the same sensed pressure level such that when there is a need for pressurized flow that both pumps will supply at least part of the flow. The main problem with such a prior art arrangement is that no matter how closely the pumps are set, one pump will almost always start first and the other pump or pumps sensing the increased pressure will not operate. Even when it is possible to set the pumps to supply flow simultaneously, contamination, wear, spring deterioration and other variations will soon change such that one pump will start off supplying flow and the other pump or pumps will not start until the system requirements exceed the capacity of the first pump. The concept can be implemented with two or more pumps.

The prior art multiple pump system allows one pump to lead and the other pumps to start flowing when pressure drops due to a flow demand higher than the first pump can supply. One pump starts and the others start as needed. Some pump manufacturers recommend their pumps be set with triggering pressures 100–150 PSI apart so that they will not try to start flowing at the same time. The problem with starting the prior art system pumps at nearly the same pressure is that the first pump can be forced to no flow when the second pump flow reaches the manifold. In this situation the pumps can oscillate on and off so fast that they suffer mechanical damage.

Thus it can be seen that there is a need for a multi-pump system that will allow for multiple pumps to supply hydraulic fluid to a single hydraulic circuit.

SUMMARY OF THE INVENTION

A rotary flow divider is normally used to divide the flow from a single pump to two or more separate circuits. Operating in reverse of normal installation, the rotary flow divider can become a rotary flow combiner, combining two or more flows instead of dividing them. Normally hydraulic fluid from a pump is fed into a single inlet of a rotary flow divider, is ported to two or more identically sized hydraulic motors in the rotary flow divider and flows out two or more outlets to supply hydraulic fluid in equal volume to two or more circuits. The hydraulic motors of the rotary flow divider have a common shaft so they must turn at the same rate and since they are equal in size they pass the same flow. Equal flow leaving each hydraulic motor outlet of the rotary flow divider is sent to devices needing the same flow even though the devices may operate at different pressures.

In this invention the rotary flow divider's normal outlets become inlets for the rotary flow combiner receiving flow from multiple pump sources and combines them into a common flow output. Since the hydraulic motors of the rotary flow combiner perform like pumps when driven it does not matter if the pressure compensating pumps with or without load sensing have exactly the same pressure setting. When the circuit needs flow the pressure drop at the rotary flow combiner outlet also gives a pressure drop at both inlets causing the pump compensators to shift both pumps on flow and to maintain them on flow. With both pumps flowing pressure at the outlet of the flow combiner equalizes.

In another aspect of the invention, when the system requires more fluid than the pumps are capable of producing, pressure drops below compensator setting of both pumps and they will go to full flow. If one pump has less flow than required to meet the demand it will see a vacuum at its outlet since the rotary flow combiner acts as a pump, at this point hydraulic fluid will be drawn directly from a reservoir to make up the required flow difference. This differential flow is powered by the pump with the larger flow through the rotary flow combiner.

DESCRIPTION OF THE PREFERRED EMBODIMENTS

Figure 1:
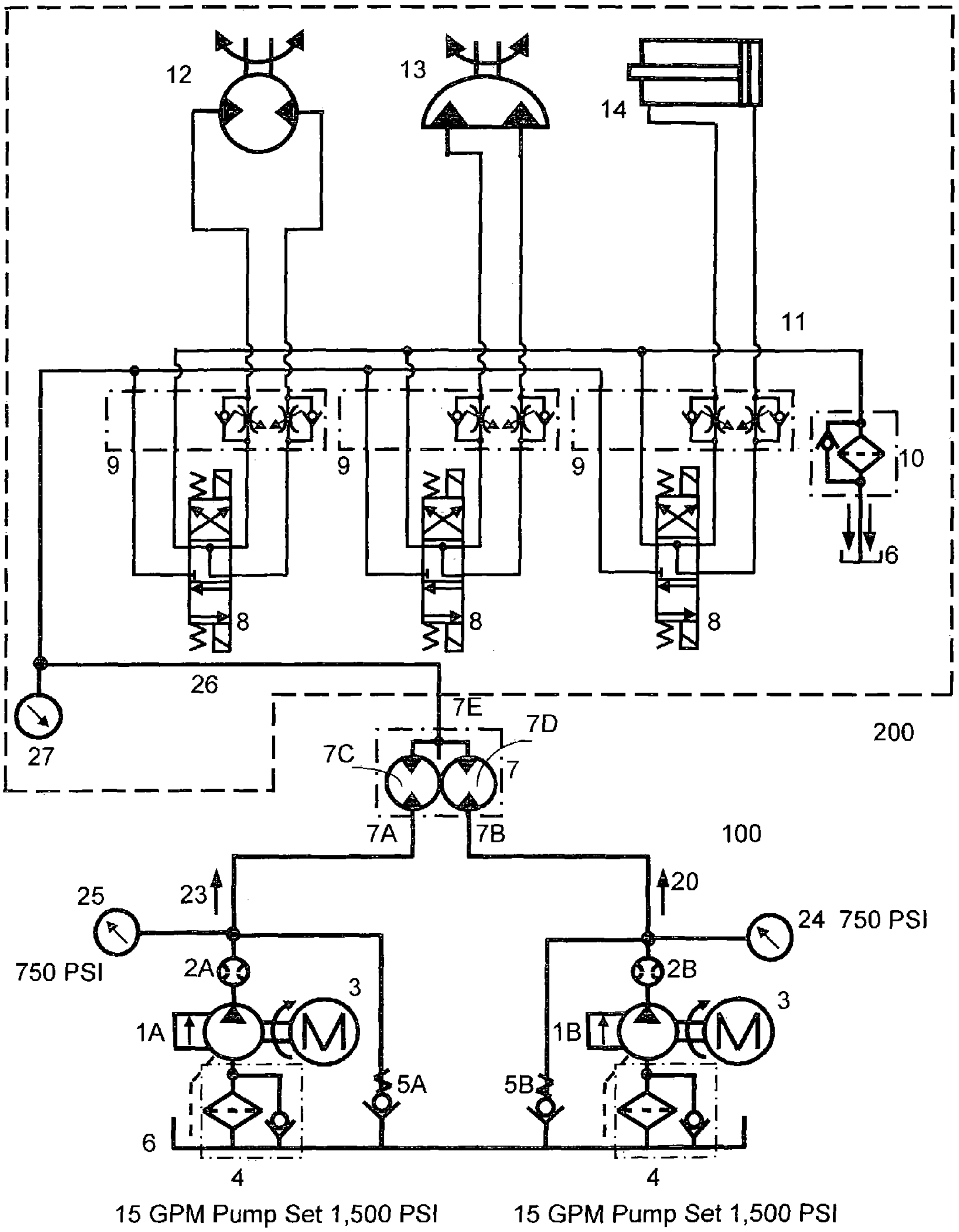
FIG. 1 illustrates the preferred embodiment of the present invention prior to actuation of any actuator in the driven circuit.

FIG. 1 illustrates the preferred embodiment of the present invention. As shown in FIG. 1 a hydraulic system 100 comprises two pressure compensated pumps 1A and 1B powered by drives 3 which can be electrical or can be internal combustion engines or a combination of one electrical motor and one engine. The system 100 supplies fluid power to any number of actuators such as fluid driven rotating actuators 12, 13 or a fluid driven linear actuator 14 in driven circuit 200. Three position solenoid controlled valves 8 can be used to control the operation of the rotating actuators 12, 13 and linear actuator 14 while the meter out flow controls 9 can set the flow requirements for each actuator 12, 13, 14. Filter 10 filters the flow of hydraulic fluid back to reservoir 6. Anti-cavitation check valves 5A and 5B, have 1 PSI springs in them so they can open and keep the rotary flow combiner 7 from starving for hydraulic fluid from a either pump 1A, 1B. Flow meters 2 can show the flow of each pump 1A, 1B and pressure gauges 24 and 25 can show pressure from the pumps 1A and 1B in supply lines 20 and 23. Pressure gauge 27 shows the pressure in line 26, which is the outlet of the rotary flow combiner 7 and the supply for the driven circuit 200.

Figure 2:
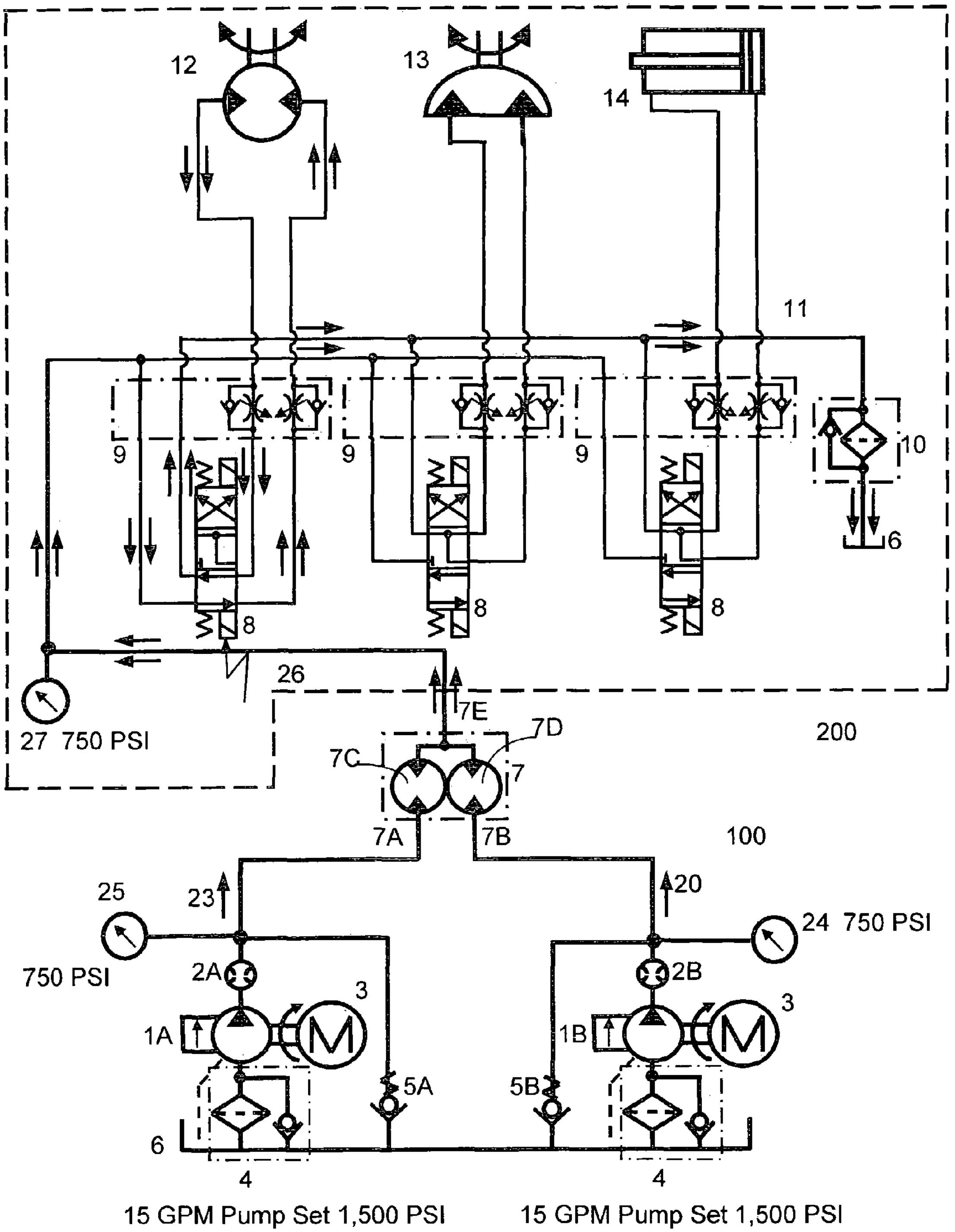
FIG. 2 illustrates the operation of the preferred embodiment of the present invention when the embodiment is functioning with identical pumps at low pressure.

FIG. 2 illustrates the hydraulic system 100 with the hydraulic motor 12 using, for example, 22 gallons per minute (GPM) flow as set by the meter out flow controls 9. The rotary flow combiner 7 accepts fluid from the first pump 1B that starts flowing and immediately the operation of the rotary flow combiner 7 will lower the pressure in line 23 enough to trip the pump 1A making it flow as well. Check valve 5A connected parallel to pump 1A, keeps the left rotary motor 7C of the rotary flow combiner from cavitating by allowing hydraulic fluid to flow to it from the reservoir 6 until pump 1A produces flow. Pressure on gauges 24, 25 and 26 will read at or near the same pressure (750 PSI) while the rotary motors 7C and 7D are running. Flow meters 2A and 2B will show identical flow when both pumps 1A and 1B are operating. Both pumps 1A and 1B will give equal flow until reaching set flow of meter out flow control 9, thus the system makes continual effective use of both pumps 1A and 1B.

Rotary flow dividers have a characteristic referred to as 'intensification' when used in the conventional manner. If there is resistance to flow out of one outlet of a rotary flow divider, then pressure in that outlet will intensify as the rotary flow divider will attempt to maintain the same volume of flow to each outlet. In this invention, with the rotary flow divider reversed to be a rotary flow combiner 7, fluid entering the inlets 7A and 7B is deintensified so if one pump 1A is at 1000 PSI and the other pump 1B is at 0 PSI, then the outlet line 26 will be at 500 PSI. (1000+0/2=500).

Figure 3:
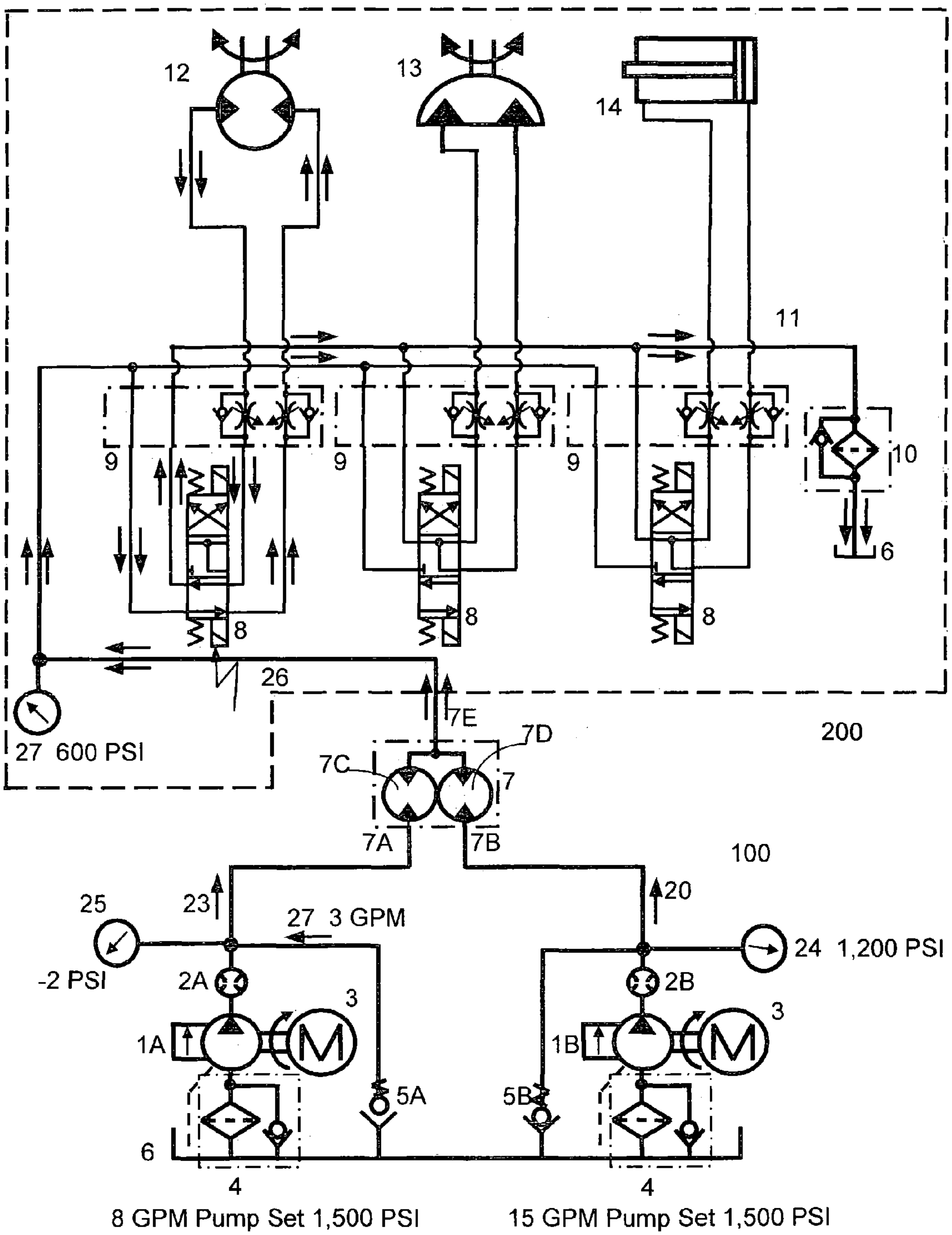
FIG. 3 illustrates the operation of the preferred embodiment of the present invention when the embodiment is operating with pumps of different flows at less than maximum pressure.

FIG. 3. Illustrates the hydraulic system 100 of the hydraulic motor actuator 12 using hydraulic fluid at a rate again of 22 GPM as set by meter out flow controls 9. In this arrangement of the driven circuit 200 the left pump 1A is set to pump no more than 8 GPM so anti-cavitation check valve 5A is forced open by atmospheric pressure which pushes an extra 3 GPM into line 23. The same result would occur if left pump were replaced with a pump only capable of producing 8 GPM flow. Because of the vacuum, gauge 25 will actually read a pressure slightly below zero such as −2 PSI. Pump 1B is at 11 GPM and 1200 PSI. Note that pump 1B is actually capable of pumping 15 GPM at 1500 PSI and that pump 1B provides the extra power that allows the rotary flow combiner 7 to pull additional hydraulic fluid through the check valve 5A. Since only one pump 1B is at pressure, hydraulic fluid going to the hydraulic motor actuator 12 is only at half pressure 600 PSI; (1200 psi+0 psi)/2=600 PSI. Flow meter 2A is showing 8 GPM while flow meter 2B is showing 11 GPM with the flow through the check valve 5A making up the rest of the 22 GPM flow.

Figure 4:
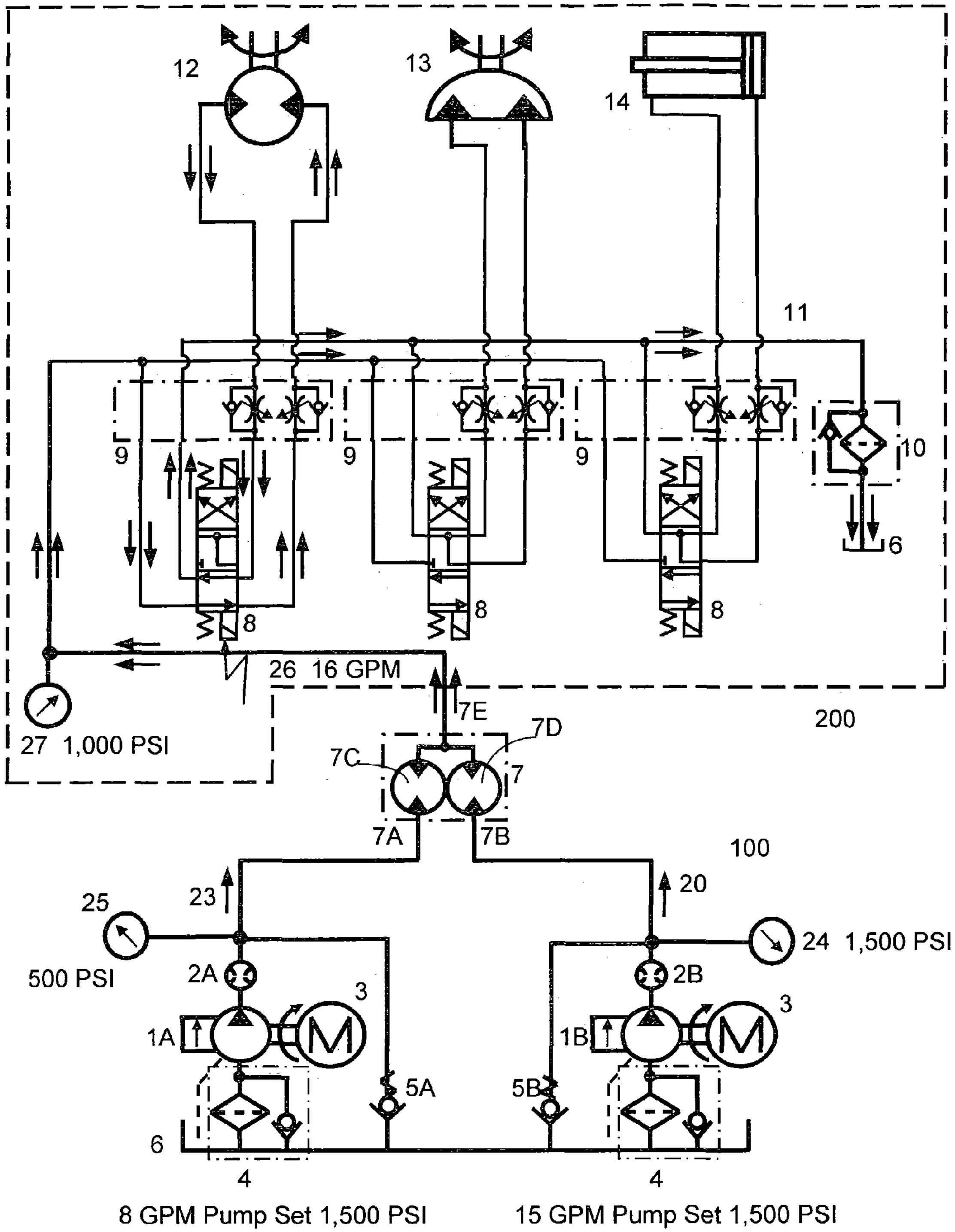
FIG. 4 illustrates the operation of the preferred embodiment of the present invention when the embodiment is operating with pumps of different flows near maximum pressure.

FIG. 4 illustrates the hydraulic system 100 with said driven circuit 200 with the hydraulic motor actuator 12 still requiring hydraulic fluid at the same 22 GPM rate as set by meter out flow control 9. In this case the left pump 1A is only capable of pumping 8 GPM and the pressure required to operate the hydraulic motor actuator 12 is higher than half the set pressure of pump 1B. The pump 1B will go to full pressure and the flow from pump 1B will be reduced (a characteristic of pressure compensated pumps). When pump 1B flow has dropped to 8 GPM, flow from pump 1A will push into the left inlet 7A of the rotary flow combiner 7 at 500 PSI and the rotary flow combiner will push 16 GPM at 1000 PSI into the driven circuit 200. This flow is not enough to meet the full requirements of the driven circuit 200 but will keep the driven circuit 200 working. In all cases, flow into the inlets 7A and 7B of the rotary flow combiner 7 will be equal when any flow is present.

Figure 5:
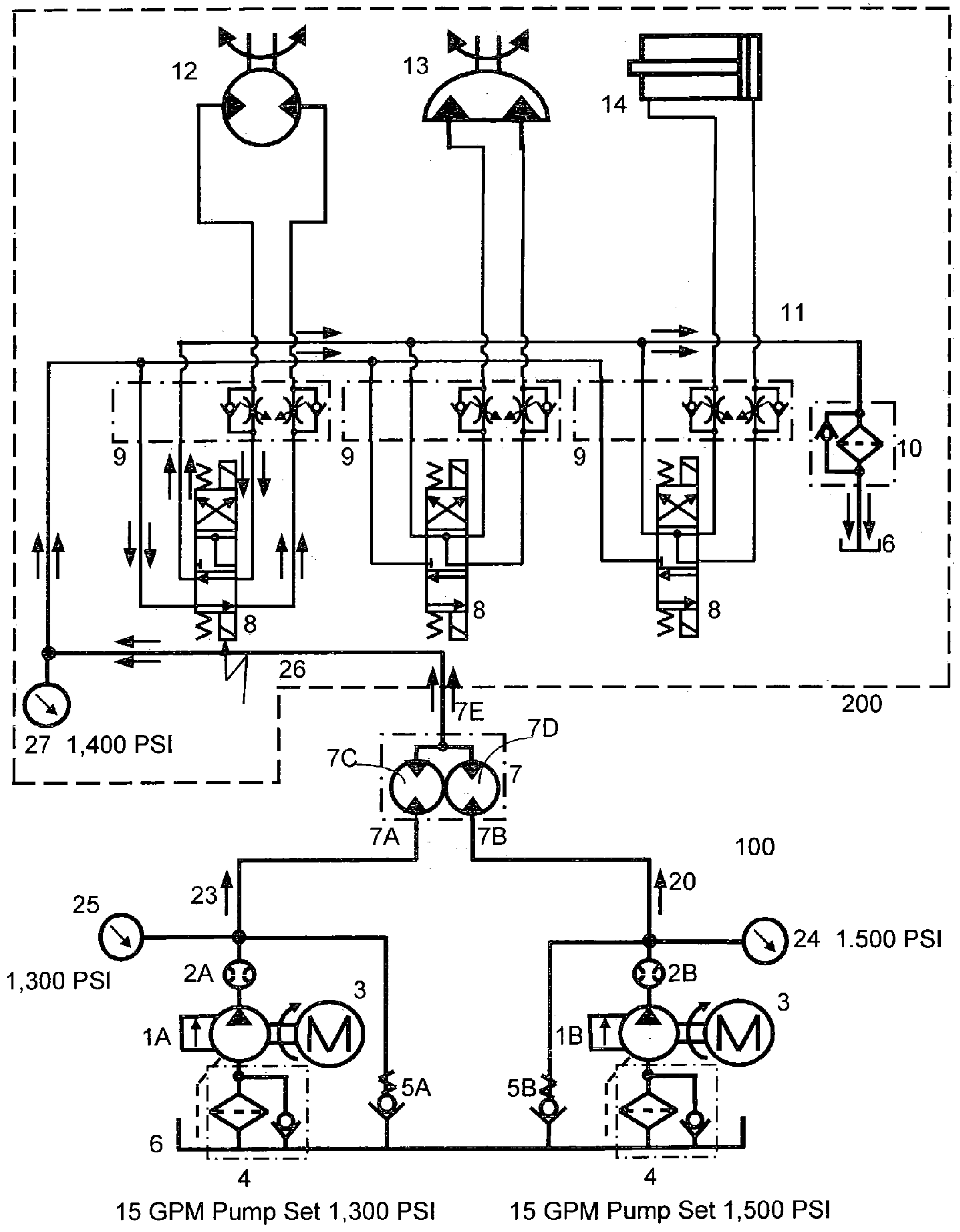
FIG. 5 illustrates the operation of the preferred embodiment of the present invention when the embodiment is operating with pumps at different pressures while an actuator is moving at a pressure higher than the low pressure pump can reach.

FIG. 5 illustrates the driven circuit 200 with the hydraulic motor actuator 12 still requiring hydraulic fluid at a rate of 22 GPM as set by meter out flow control 9. In this case the hydraulic motor actuator can use 22 GPM at a pressure above what the lowest pressure pump 1A or 1B can supply. The pump 1A can produce 15 GPM at 1300 PSI and the pump 1B can produce 15 GPM at 1500 PSI. The rotary flow combiner 7 in this case will produce output flow of hydraulic fluid to the driven circuit 200 at 22 GPM and 1400 PSI maximum and 15 GPM up to 1500 PSI. Again although pump 1A is not fully capable of meeting the load requirement both pumps will operate at capacity. Without a rotary flow combiner 7 this combination of pumps, with flows into a manifold, could only produce 15 GPM at pressures above 1300 PSI because the lower pressure pump 1A would compensate to no flow above this pressure.

Figure 6:
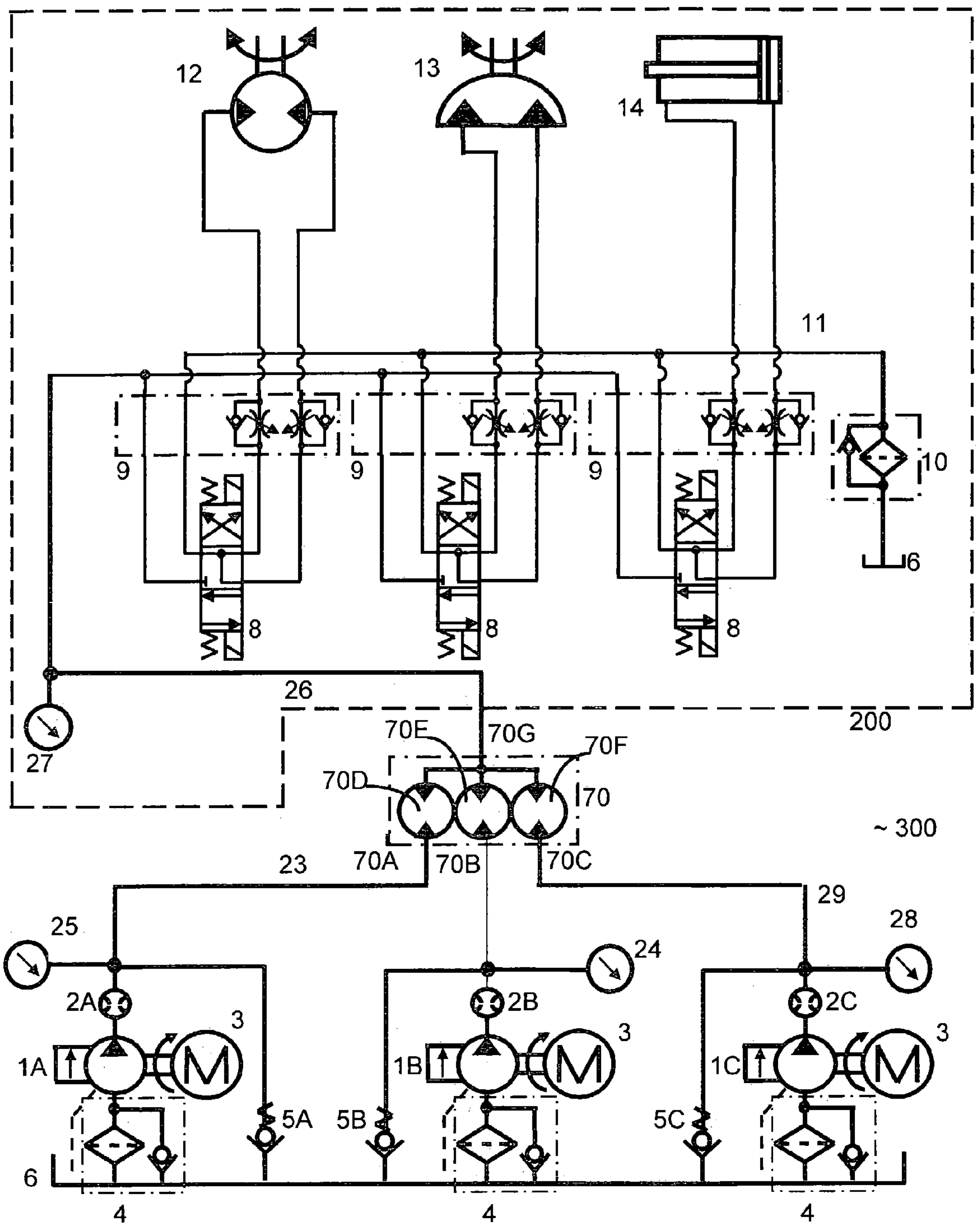
FIG. 6 illustrates the operation of a second embodiment of the present invention including three input pumps.

FIG. 6 illustrates the driven circuit 200 with the hydraulic motor actuator 12 still requiring hydraulic fluid at a rate of 22 GPM as set by meter outflow controls 9. This hydraulic system 300 for example uses the same driven circuit 200 but uses three pressure compensated pumps without load sensing 1A, 1B and 1C that feed into the inlets 70A, 70B, 70C of a three motor rotary flow combiner 70. The operation of the three motor rotary flow combiner 70 is similar to that of the two motor rotary flow combiner 7 in that each rotary motor 70D, 70E and 70F must turn at the same speed and allow for the same flow rates from each inlet 70A, 70B and 70C regardless of flow or pressure settings. The rotary motors 70D, 70E and 70F can be gear motors for example sharing a common shaft (not shown) that keeps them rotating at a proportional rotary speed such as the same speed. Fluid from the third pump 1C is supplied through line 29 to inlet 70C and gauge 28 can monitor pressure in line 29.

Using a rotary flow combiner with motors having different ratio flows (not shown) would allow different flow rated pumps to use all their flow output at a pressure without restricting the higher flow ones.

A specific example of a useful application is when separate internal combustion engines are driving pumps of the same or different volumes at the same or different pressures. Each internal combustion engine would give its required portion of flow and operate at a comparable horsepower rating for any flow requirement. Without the equal flow provided by the rotary flow combiner, one engine would do all the work most of the time, while the other burns fuel and does no useful work. Neither engine would be operating efficiently. Adding the rotary flow combiner 7 as shown above causes both engines to do a significant portion of the work at all times resulting in even wear on the engines and in more efficient operation.

A benefit of this invention is that the pumps in a multi-pump system can be set as closely as possible to the same pressure without causing the pumps to override each other. An additional benefit of this invention is that a conventional multiple pressure compensated pump with or without load sensing circuit can have a noticeable pressure drop as the lead pump reaches its maximum flow and the next pump starts flowing. This pressure drop will be at least as much as the pumps pressures are set differently and even more for a short period of time as the lagging pump or pumps respond and start flowing.

What is claimed is:

1. A rotary flow combiner circuit for supplying hydraulic fluid under pressure to an actuator comprising;

a first pump drawing hydraulic fluid from a reservoir and supplying it under pressure to a first inlet of a rotary flow combiner;

a second pump drawing hydraulic fluid from a reservoir and supplying said fluid to a second inlet of a rotary flow combiner;

an actuator connected to an outlet of said rotary flow combiner.

2. The rotary flow combiner of claim 1 wherein fluid from said first inlet is supplied to a first hydraulic rotary motor in said rotary flow combiner and wherein fluid from said second inlet is supplied to a second hydraulic rotary motor in said rotary flow combiner and wherein said first and said second hydraulic rotary motors share a common shaft such that hydraulic fluid flow through said first inlet is held in a constant proportion to flow through said second inlet.

3. The rotary flow combiner of claim 2 including a first check valve circuit connected in parallel to said first pump from said reservoir to said first inlet such that said rotary flow combiner can draw hydraulic fluid from said reservoir directly through said first check valve circuit.

4. The rotary flow combiner of claim 3 including a second check valve circuit connected in parallel to said second pump, said second check valve circuit connected from said reservoir to said second inlet such that said rotary flow combiner can draw hydraulic fluid from said reservoir directly through said second check valve circuit.

5. The rotary flow combiner of claim 2 wherein the constant proportion is equal flow through said first and second inlets.

6. A rotary flow combiner circuit for supplying hydraulic fluid under pressure to a driven circuit, said rotary flow combiner circuit comprising;

a first source of pressurized hydraulic fluid supplying a first inlet of a rotary flow combiner;

a second source of pressurized hydraulic fluid supplying a second inlet of a rotary flow combiner;

said driven circuit receiving said hydraulic fluid from an outlet of said rotary flow combiner and a first check valve connected to said reservoir and to said first inlet in parallel to said first source of pressurized fluid such that said rotary flow combiner can draw hydraulic fluid from said reservoir through said first check valve.

7. The rotary flow combiner of claim 6 wherein hydraulic fluid from said first inlet flows to a first gear motor in said rotary flow combiner and wherein hydraulic fluid from said second inlet flows to a second gear motor in said rotary flow combiner and wherein said first and second gear motors rotate at proportional speeds such that flow from said first inlet is in proportion to flow through said second inlet.

8. The rotary flow combiner circuit of claim 6 including a second check valve connected to said reservoir and to said second inlet in parallel to said second source of pressurized hydraulic fluid such that said rotary flow combiner can draw hydraulic fluid from said reservoir through said second check valve.

9. The rotary flow combiner circuit of claim 7 wherein the flow through the first inlet is in one to one proportion with the flow through the second inlet.

10. The rotary flow combiner circuit of claim 6 wherein the second pump provides power for the rotary flow combiner to draw fluid through said first check valve.

11. The rotary flow combiner circuit of claim 7 wherein said combiner circuit includes a third source of pressurized hydraulic fluid supplying a third inlet and a third gear motor of the rotary flow combiner, said third gear motor rotating in proportion to said first gear motor.

12. The rotary flow combiner circuit of claim 6 including a linear actuator in said driven circuit.

13. A rotary flow combiner for supplying fluid under pressure to an outlet comprising;

a first inlet for receiving pressurized fluid from a first pump;

a second inlet for receiving pressurized fluid from a second pump;

a first motor receiving fluid from said first inlet;

a second motor receiving fluid from said second inlet;

a shaft connecting said first motor to said second motor for rotation therewith such that fluid flow through said first inlet is held in proportion with fluid flow through said second inlet and an actuator connected to said outlet, said actuator powered by fluid flow through said first and second motors and a first check valve connected to said reservoir and to said first inlet in parallel to said first pump such that said rotary flow combiner can draw hydraulic fluid from said reservoir through said first check valve.

14. The rotary flow combiner of claim 13 wherein the proportion is equal flow through said first and second inlets.

15. The rotary flow combiner of claim 14 wherein said second motor will create a vacuum at the second inlet if said first inlet is at a higher pressure than said second inlet.

16. The rotary flow combiner of claim 13 wherein the fluid is hydraulic fluid.

17. The rotary flow combiner of claim 13 wherein the first and second motors are hydraulic gear motors.

* * * * *